Figure 1:
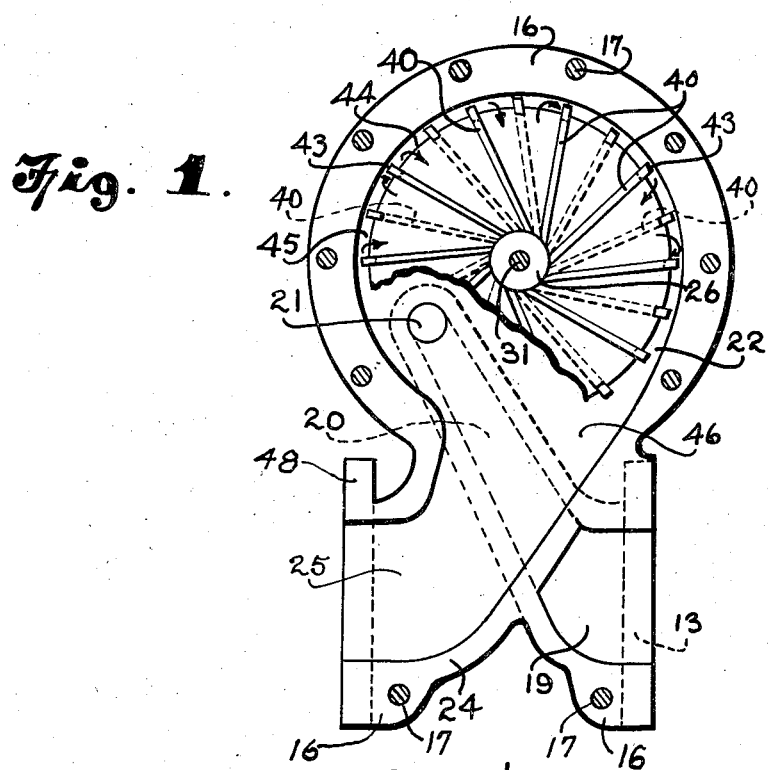

June 13, 1944. H. H. SCHMIDT 2,351,072
METHOD OF PRODUCING VAPOROUS MIXTURES CONTAINING AIR
Filed Oct. 1, 1941

INVENTOR
HERMANN H. SCHMIDT
BY Alfred R. Fuchs
ATTORNEY

Patented June 13, 1944

2,351,072

UNITED STATES PATENT OFFICE 2,351,072

METHOD OF PRODUCING VAPOROUS MIXTURES CONTAINING AIR

Hermann H. Schmidt, Hanover, Kans., assignor to The Universal Royalty and Development Company, St. Joseph, Mo., a corporation of Missouri Application October 1, 1941, Serial No. 413,187

14 Claims. (Cl. 48—180)

My invention relates to a method of producing vaporous mixtures containing air, such as preparing fuels for combustion, and producing a substantially uniform mixture of air and a liquid in a finely divided, substantially vaporous state, which, in the case of a fuel, is a mixture having substantially uniform properties of combustion.

It is a purpose of my invention to provide a method of producing a combustible mixture for use in a combustion chamber, such as a cylinder of an internal combustion engine, in which the fuel is so finely divided and uniformly blended that, if the proper proportions of fuel and air are used to produce the blend, there will be practically nothing exhausted from the chamber that is not a product of complete combustion. My method can be used with any combustible material, whether liquid or powdered solid material, or a mixture of the two, as long as the material is capable of being finely divided. Vaporous mixtures, or nebulous mixtures, of liquids that are not readily vaporizable, and solid fuels and air can be made by my method where this is impossible by methods previously in use.

While my method is particularly adapted for preparing fuels for combustion, it is also equally as useful in producing vaporous mixtures of a liquid, or a powdered solid, or a liquid and a powdered solid, and air, or of a plurality of liquids and air, or of a gas or vapor and air, so as to thoroughly blend the air therewith and produce a substantially uniform mixture of air and the finely divided liquid, or solid particles, or air and liquid and solid particles, or vapor or gas and air, which particles, in the case of a liquid, are so finely divided as to form substantially a vapor, or mist, or fog.

The thoroughness of blending of the material is obtained due to the whirling of the air and the liquid, or powdered material, or the liquid and powdered material, or plurality of liquids or vapor or gas, in a chamber at high velocity, so as to cause centrifugal force to throw the liquid or solid particles outwardly toward the periphery of the centrifugal whirl thus created, the liquid or solid material and air being introduced into the whirl either at the center thereof or near the center, but eccentrically thereof. This whirling is, preferably, done by means of rotatable impelling means, such as described in my Patent No. 2,241,425, patented May 13, 1941, and in my co-pending application, Serial No. 196,525, filed March 17, 1938, patented December 9, 1941, Patent No. 2,265,199. The essential parts of a simple apparatus for carrying out my method are shown in the accompanying drawing.

One of the important features of my method is the introduction of the material that is to be blended with the air into a vaporous mixture, into a confined space at such rate and in such quantity as to only occupy part of the space, so that when the same is violently, centrifugally whirled in the presence of a large quantity of air, the material and air will all be subjected to the centrifugal force and will be thoroughly blended by the action of the centrifugal force. The method also involves the discharge of the material blended with the air directly from the periphery of the whirl in a vaporous condition, the formation of the vaporous mixture being due to the rapid rotation of the impelling means and to the bombarding of the walls of the confining space with the liquid or solid material, that is to be blended with the air, and the subjecting of the liquid, or similar material, to a shearing action while under the influence of the centrifugal force, and particularly to the creation of streams of liquid that inter-engage each other at the periphery of the whirl to aid in the breaking up of the particles of the liquid and forming a fine, thoroughly broken up, vaporous material therefrom that is thoroughly and completely blended with the air. The streams of the liquid particles are created while under the influence of centrifugal force, by dividing the material that is being whirled centrifugally into two bodies, that are kept separate until the material reaches the periphery of the whirl, where the same form into streams that engage each other violently to cause the fine division of the liquid, or powdered material, that is being so whirled.

Other objects and advantages of my invention will appear as the description of the same proceeds. I desire to have it understood, however, that I do not intended to limit myself to the particular details shown or described, except as defined in the claims.

Figure 2:
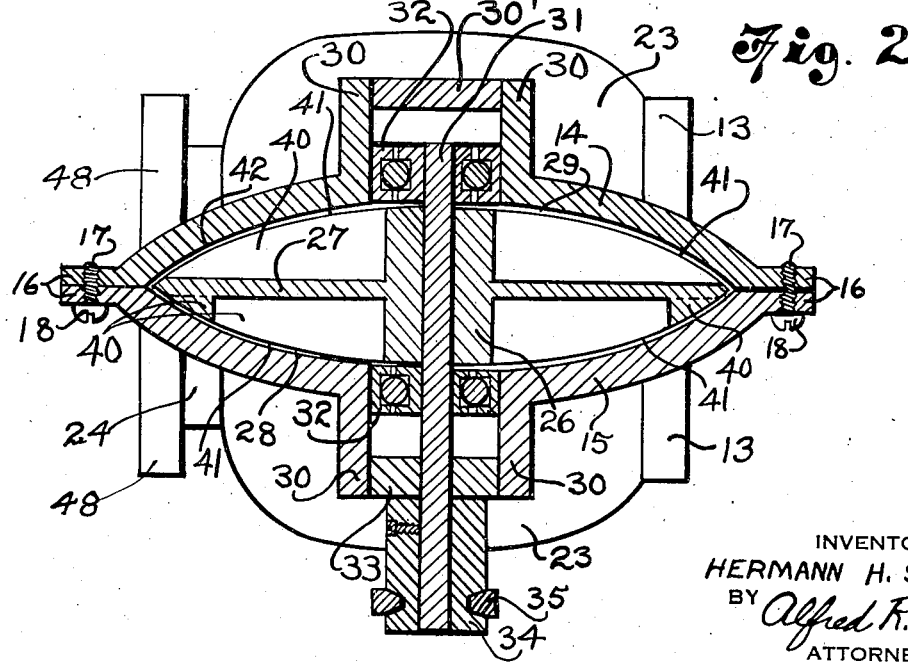

In the drawing:

Fig. 1 is a vertical sectional view perpendicular to the axis of rotation of the rotor of an apparatus that may be used to carry out my method, and Fig. 2 is a section taken at right angles to Fig. 1, and on a somewhat enlarged scale.

While any suitable means may be used for confining the combustible material, or other liquid or powdered material, or plurality of liquids or vapor or gas, that are to be blended with air to form a vaporous or mist-like, or fog-like mixture of air and liquid, or finely divided solid material, or liquid and powdered material, or plurality of liquids, or vapor or gas, while a whirl is being set up therein to whip the same about and finely divide the material to form a mist-like or vaporous blend of the same and air, and while any suitable means may be provided for setting up this whirl while the material is so confined, as long as it serves to divide the material and the air into two portions, and as long as it is adapted to exert the shearing action, as well as the centrifugal force, above referred to, and as long as it is adapted to engage streams of said liquid, or other material, and air, with each other, one form of apparatus that is desirable is disclosed in the above referred to drawing.

Said apparatus comprises a casing made up of two sections 14 and 15, each of which is provided with a flange 16, through which securing members 17 extend, said securing members having heads 18 engaging the one flange 16 and being threaded to engage in threaded openings in the other flange 16. A flange 13 is formed partly on the member 14 and partly on the member 15, and from the central opening 19 in said flange 13 a pair of passages 20 extend, one being formed in each of the casing portions 14 and 15. The passages 20 extend through openings 21 into the chamber 22, formed between the two halves of the casing 14 and 15, the passages 20 gradually decreasing in size toward the opening 21, avoiding any sharp corners or offsets, or variations in size therein that might cause whistling or other noise as the fluid passes through the passage 20. In order that said passages will not have any reduced portions or sharp offsets therein, the same are provided in the form of tubular conduits having outer wall portions 23 that extend along opposite sides of the casing members 14 and 15, so as to terminate inwardly from the outer peripheral edge of the annular portions of said casing members and at a point spaced circumferentially from the outlet conduit 24, said outlet conduit having a passage 25 extending outwardly from the chamber 22 between the two passages 20.

Within the chamber 22 provided between the casing members 14 and 15, is a rotor having a hub portion 26 and a central disk-like dividing wall 27, which divides the casing into a pair of chambers 28 and 29 lying on opposite sides of said wall 27. Each of the casing portions 14 and 15 is provided with a bearing portion 30. A shaft 31 is mounted in an opening in the hub portion 26 in fixed position, and is mounted for rotation in the casing by means of the ball bearings 32 mounted in the bearing portions 30. One bearing portion 30 is provided with a plug 30′ providing a fluid tight closure, and a sleeve 33 in which the shaft 31 rotates is mounted in the other bearing member 30. Mounted on the shaft 31 to rotate therewith is a pulley 34, which is provided with a groove in which the belt 35 operates for rotating the rotor, said belt being driven in any desired manner, as by means of a suitable pulley carried by the engine shaft, or by a shaft geared to the engine shaft of an internal combustion engine, said pulley engaging the sleeve 33.

The rotor is rotated in the direction of the arrow, shown in Fig. 1, and is rotated at a very high velocity. Said rotor is provided with blades or vanes 40 thereon, which are, preferably, arranged in staggered relation on opposite sides of the partitioning or dividing disk portion 27. Said vane or blade members 40 are cast integral with the central partition 27 and extend at an acute angle to the radial, being inclined backwardly from the hub portion to the periphery of the rotor, considering the direction of rotation of the rotor as being forward. While the particular angle at which said vanes or blades extend to a radial line, through their inner ends, for example, may be varied, these are shown as extending at substantially an angle of 30 degrees to the radial in the drawing. Said blades or vanes taper outwardly toward the periphery of the rotor, becoming gradually narrower toward their outer ends, the edges thereof being formed on a gradual curve, as shown at 41 in Fig. 2. The casing portions 14 and 15 are similarly curved, the side walls of said casing adjacent the side edges of the bladed rotor being of substantially the same contour as said blades, the walls gradually approaching each other toward the peripheral flanged portions 16 on a curve, as shown at 42 in Fig. 2.

It will be noted that a clearance is shown between the edges 41 of the blades or vanes and the curved concave wall portions 42. It is to be understood that the clearance between these blades and the wall portions is only sufficient for mechanical purposes, so that there will be no engagement of said blades with said wall portions, the edges of the blades and the wall portions being of substantially the same cross sectional contour at their adjacent portions.

The disk-like central wall or partition portion 27 of the rotor ends short of the blades or vanes 40, the vanes or blades having portions 43 that extend outwardly beyond the peripheral edge 44 of the disk-like portion 27, and said projecting blade portions 43 extend across the peripheral edge 44 of the disk-like portion 27, and closely adjacent the annular periphery of the chamber 22 adjacent the wall portions 42, so as to just have mechanical clearance from said casing beyond the periphery of the disk-like portion. A space is thus provided between the vanes or blades 40, as shown at 45, between the casing wall and the peripheral edge of the disk-like portion 27.

It will be noted that at the lower end of the casing adjacent the outlet passage 25 said casing widens, as indicated at 46, to provide an outlet chamber leading into the outlet passage 25, into which the peripheral edge or rim portion of the rotor extends. The members 14 and 15 are provided with flange portions 48 thereon, that together form a flange that is bolted in fluid-tight relation to the flange on the inlet conduit leading into the intake manifold of an internal combustion engine, for example, and the flange 13 is similarly bolted to a flange on a conduit extending from a carburetor, or other means for supplying fuel and air, the carburetor and intake manifold not being shown.

The rotation of the rotor in the casing draws the mixture of air and combustible fluid in through the passages 20 and the opening 21 into said casing, part of the mixture of air and combustible fluid passing through the one passage 20 into the chamber 28, and the other portion thereof through the other passage 20 into the chamber 29. As the mixture of air and combustible fluid is drawn into the chambers it comes into engagement with the vanes or blades on the rotor and is given a violent centrifugal whirling or whipping motion, causing the same to be thrown outwardly centrifugally toward the outer peripheral edge of the annular passage adjacent the peripheral edge 44 of the partitioning means 27, and also into engagement with the side walls of said chambers, causing some of said air and combustible fluid to be forced between said side walls and said blades 40, and some of the same to be thrown transversely across the peripheral edge 44 of the partitioning means 27 from the chamber 28 to the chamber 29, and vice versa, thus causing a complete breaking up into a vapor of any of the fluid that may not have previously been in a vaporous state, and thoroughly and completely mixing the air and fluid vapor, so as to make a uniform blend thereof having a uniform proportion of air and combustible vapor therein throughout the mass thereof. The rotation of the rotor throws the blended gaseous fuel outwardly toward the periphery of the rotor and into the outlet chamber 47 and outlet passage 25, the velocity given said combustible mixture causing the same to pass into the intake manifold and to be injected into the cylinder, or cylinders, of the internal combustion engine, or other combustion chamber, that may be open to the intake manifold at the time that the combustible mixture is being passed into the same.

It will be noted that the entrance of the liquid, or solid material, and the air, or other gas, that is to be combined therewith, into the chamber in which the centrifugal whirl takes place, is eccentrically of the whirl through the openings 21, and that the material is introduced into said chamber into the whirl at a point such that the material has to travel in the whirl at least through an arc of over 180 degrees of said whirl before passing into the discharge passage or outlet from the chamber. It will also be noted that the liquid, or solid material, and the gaseous material, such as the air, are immediately thrown into a whirling movement upon passing into the chamber, due to engagement of the rotor vanes therewith, and that the air and liquid, or solid particles therein, are thrown outwardly due to the centrifugal force created by the rapid whirling motion produced by the rotating element in the chamber, and that streams of said air, or other gas, with the liquid, or solid particles therein, are thrown outwardly centrifugally and across the periphery of the central partition provided by the member 27 from one side to the other side of said partition, as indicated by the arrows in Fig. 1, said streams violently inter-engaging to further break up and divide the material in the chamber, so that a substantially vaporous, or fog-like, product results, having the air, or other gaseous ingredient, so thoroughly mixed with the liquid, or solid, ingredient, and said liquid, or solid, ingredient, so finely divided that a vapor, or fog, of said liquid, or solid ingredient, and said air, or other gaseous material, results.

In carrying out the method of producing the vaporous, or fog-like mixture of air, or other similar gaseous material, and a liquid, or a powdered solid material, such as producing a combustible mixture or increasing the combustibility of a fuel comprising air and a liquid, or finely powdered fuel ingredient, the material, or materials, that are to be incorporated in the air to produce the vaporous, or fog-like product, are whirled and whipped about in a chamber, or other space, such as the chamber above described, to finely divide the same and, preferably, produce a vapor, or fog, thereof. In the case of a combustible mixture this may be done in combination with a carburetor, or other similar means, for producing a combustible mixture of the character now utilized in internal combustion engines, or in any other desired manner. The combustible mixture produced by the ordinary carburetor can be very greatly improved and the efficiency thereof greatly increased by introducing the same into a chamber and dividing the same into two portions and rotatably impelling each portion of the same at high velocity in the same direction to whip the same about in the chamber, and break up all of the particles of liquid fuel, or finely divided solid fuel, that are carried in the air, so as to finely divide and substantially vaporize all thereof, finely dividing the air and intimately mixing the air and finely divided fuel particles, or vapor, so as to produce a uniform fuel mixture of a substantially vaporous, or gaseous, nature. The whipping, or whirling about, is, preferably, done in a chamber that closely conforms in size and shape to the impelling means, so that a sort of shearing action takes place between the impelling means and the walls of the chamber, and so that the two whirling masses of material, comprising air and a combustible fuel material, for example, are directed centrifugally outwardly toward the periphery of the chamber and of the rotative impelling means. Thus two centrifugal whirls of said material that is being finely divided and blended are created and are directed transversely into engagement with each other at the periphery of the whirls, so that streams, under centrifugal force, of said air containing liquid, or solid particles, are thrown into violent engagement with each other transversely of the chamber to further thoroughly break up, finely divide and vaporize the liquid particles, or make a substantial vapor of the air and solid particles that may be so treated.

While the ordinary carburetor is referred to for producing a mixture of air and liquid particles entrained in the air, this can be done in other ways, such as by merely passing the air over a body of fuel, so as to pick up the volatile portions thereof and carry the same along in the stream of air and then rotatively impelling, or whipping, or whirling, the same about in a chamber in two separate portions, so as to produce the two centrifugal whirls that produce the inter-engaging streams at the periphery thereof, as above described.

It is desirable, to obtain complete combustion of a fuel mixture, to introduce additional air into the fuel mixture produced by the ordinary carburetor at the time of introduction into the chamber in which the whirling takes place, or prior to such introduction, so as to whip about the combustible mixture with additional air and make a thorough uniform blend of air and said combustible material, containing a much higher percentage of air that is adapted to support combustion than was previously the case.

My method can also be carried out with a fuel ingredient that is not of a volatile or readily vaporizable character, such as a liquid that is not readily vaporizable, or a powdered fuel material, or a liquid fuel material and such a powdered solid fuel material together. The liquid of a less volatile character than the usual internal combustion engine fuel and/or the solid finely powdered fuel material, can be mixed with air in any desired manner, as by spraying the same with ordinary spraying means, into a body of air and then introducing the mixture of the sprayed fuel and air into the chamber in which the same is divided into two portions and whirled about violently, so as to cause the streams of fuel to be engaged with each other at the periphery of the whirl in the manner previously referred to.

The fuel mixture is, of course, either introduced into the chamber eccentrically but near the center of the whirl, as previously mentioned, or centrally of the whirl.

While liquid fuel material, powdered fuel material, and air, have been referred to above, my method is not limited to the production of combustible fuel mixtures in this manner, as any liquid, or powdered material, or a liquid and powdered material, or a blend of a plurality of liquids, can be mixed with air to produce a fine vapor, mist, or spray, in which the liquid, or solid ingredient, is so finely divided that the resultant product is substantially a vapor, or a fog, or mist, by my improved method, and the resultant product can be utilized in many ways advantageously. Thus one material can be coated with another material much more evenly and smoothly, by so finely dividing the same and carrying the same in a stream of air into engagement with the member upon which the coating is to be placed, than if the spraying is done by means of the ordinary spray gun, or other spraying device, now in use, in which air under pressure, or similar means, is utilized to produce the spray, or in which the spray is produced by merely allowing the material to travel outwardly on a rotating disk until it splatters off the edge thereof. While such a splatter may be a fine splatter, or may be referred to as a spraying of the material, the same is still distinctly in drops, or fine droplets, whereas, by the use of my method, the material is no longer in the form of drops that can be recognized as such, but is thoroughly intermingled and intimately associated with the air, so as to make a substantially uniform blend with the air, permitting the application of the material thus carried in the air, to a surface or to any other object, much more smoothly and evenly than would otherwise be possible.

Furthermore my method can be used for producing air mixtures with various materials that it is desirable to mix with air for various purposes, that cannot now be thoroughly enough mixed with air to be carried along by the air for any length of time, except by other than mechanical means, such as other vapors or gases, or mixtures of gases or vapors with liquids, or powdered solid materials. Thus my method can be used for humidifying air, by merely introducing a spray of water and air into the chamber referred to, and whirling and whipping the same about, so as to completely vaporize the water and make a mixture of air and water such that it will be a substantially true vapor and in which the humidity of the air will be controlled, so as to obtain the desired relative humidity thereof entirely by mechanical means. Thus liquids, vapors, gases and solid materials in finely divided form can be incorporated or mixed with air, so as to be thoroughly blended therewith and uniformly distributed in a stream of air, so as to form substantially a mist, or vapor, of the air and the material so introduced and so incorporated, without materially changing the temperature of the air or without the addition of heat or the use of heat in connection with the method.

In carrying out my method it is usually desirable to have the chamber in which the rotative whirls are set up unrestrictedly open to the atmosphere, so as to permit air to enter the chamber without restriction and to provide for the discharge of the vaporous product therefrom unrestrictedly at substantially atmospheric pressure. This is particularly true where a liquid is blended with air or other gas, or gases, in which either the liquid or one or more of the gases has a tendency to condense when subjected to a pressure that is higher than that of the atmosphere.

While heat is not necessary or desirable for obtaining the vaporous mixtures containing air, by the method described herein, yet if it is desirable to use heat in connection with the production of the vaporous mixtures, or if it is desired to have these at a relatively high temperature above that of the atmosphere, heat can be used in conjunction with my method, by either heating the air or the material mixed therewith, or both, as may be desired.

What I claim is:

1. The method of producing a uniform mixture of a liquid and a gas, comprising separating said liquid and gas into portions, rotatively impelling each of said portions to whip the same about separately to create a centrifugal whirl of said gas and liquid of each of said portions, directing streams of said gas containing said liquid from each of said centrifugal whirls into violent engagement with each other around the periphery of said whirls while under the influence of the centrifugal force created by said whipping, to mix said streams, and continuously positively rotatively impelling said mixed streams to finely divide and intimately blend said liquid and gas.

2. The method of producing a uniform mixture of a mobile fuel and air, comprising introducing said fuel and air into a chamber and separating the same into portions, rotatively whipping each of said portions about in said chamber separately to create a centrifugal whirl of said fuel and air of each of said portions and throw the same against the walls of said chamber with sufficient force to finely divide the same, directing streams of said air containing said fuel from each of said centrifugal whirls transversely into violent engagement with each other around the periphery of said whirls while under the influence of the centrifugal force created by said whipping to mix said streams, and continuously positively rotatively impelling said mixed streams to further finely divide and intimately blend said air and fuel.

3. The method of producing a uniform mixture of a combustible powdered material and air, comprising introducing said powdered material and air into a chamber and separating the same into portions, rotatively whipping each of said portions about in said chamber separately to create a centrifugal whirl of said powdered material and air of each of said portions, and directing streams of said air containing said powdered material from each of said centrifugal whirls into violent engagement with each other at the periphery of said whirls while under the influence of the centrifugal force created by said whipping to finely divide and intimately blend said air and powdered material.

4. The method of producing a uniform combustible vapor of a vaporizable liquid fuel and air, comprising introducing said fuel and air into a chamber and separating the same into portions, rotatively whipping each of said portions about in said chamber separately to create a centrifugal whirl of said vaporizable liquid fuel and air of each of said portions and directing streams of said air containing said vaporizable liquid fuel from each of said centrifugal whirls into violent engagement with each other at the periphery of said whirls while under the influence of the centrifugal force created by said whipping to completely vaporize said liquid fuel and intimately blend said vaporized liquid fuel and said air into a homogeneous combustible vapor.

5. The method of producing a uniform combustible vapor comprising contacting air with a volatile liquid to produce a fuel mixture of said air and liquid, creating separate centrifugal whirls of said fuel mixture in a chamber, continuously feeding said mixture to said whirls eccentrically thereof, rotatively whipping said mixture immediately upon entering said centrifugal whirls to impart centrifugal force thereto and throw the same against the walls of said chamber with sufficient force to finely divide the same, continuously directing streams of said mixture from each of said centrifugal whirls into violent engagement with each other at the periphery of said whirls while under the influence of said centrifugal force to further divide and create a vaporous blend of said liquid with said air, and continuously discharging said vaporous blend from said chamber at the periphery of said whirls while under the influence of said centrifugal force.

6. The method of producing a uniformly blended fuel mixture comprising spraying a combustible liquid into air to provide a mixture of suspended combustible liquid particles and air, creating separate centrifugal whirls of said mixture of a combustible liquid and air in a chamber, continuously feeding said mixture of said combustible liquid and air to said whirls, rotatively whipping said mixture immediately upon entering said centrifugal whirls to impart centrifugal force thereto and throw the same against the walls of said chamber with sufficient force to finely divide the same, continuously directing streams of said air containing said finely divided combustible liquid from each of said centrifugal whirls into violent engagement with each other at the periphery of said whirls while under the influence of said centrifugal force to further divide and create a mist-like blend of said liquid with said air, and continuously discharging said blend from said chamber at the periphery of said whirls while under the influence of said centrifugal force.

7. The method of producing a uniformly blended fuel mixture comprising spraying a combustible powder into air to provide a mixture of suspended combustible solid particles and air, creating separate centrifugal whirls of said mixture of powder and air in a chamber, continuously feeding said mixture of said combustible powder and air to said whirls, rotatively whipping said mixture immediately upon entering said centrifugal whirls to impart centrifugal force thereto and throw the same against the walls of said chamber with sufficient force to finely divide the same, continuously directing streams of said air containing said finely divided combustible powder from each of said centrifugal whirls into violent engagement with each other at the periphery of said whirls while under the influence of said centrifugal force to further divide and create a mist-like blend of said powder with said air, and continuously discharging said blend from said chamber at the periphery of said whirls while under the influence of said centrifugal force.

8. The method of producing a uniformly blended fuel mixture of a powdered combustible material, a combustible liquid and air, comprising creating separate centrifugal whirls of a mixture of said powdered material, said liquid and air, in a chamber, continuously feeding a mixture of said combustible powdered material, liquid, and air to said whirls, rotatively whipping said mixture immediately upon entering said centrifugal whirls to impart centrifugal force thereto and throw the same against the walls of said chamber with sufficient force to finely divide the same, continuously directing streams of said air containing said finely divided combustible material from each of said centrifugal whirls into violent engagement with each other at the periphery of said whirls while under the influence of said centrifugal force to further divide and create a mist-like, vaporous blend of said liquid, powdered material and air and continuously discharging said blend from said chamber at the periphery of said whirls while under the influence of said centrifugal force.

9. The method of producing a uniform blend of a liquid and air, comprising creating separate centrifugal whirls in the same direction of a mixture of particles of said liquid and air in a chamber, continuously feeding said mixture to said whirls eccentrically theerof, rotatively whipping said mixture immediately upon entering said whirls to impart centrifugal force thereto and throw the same against the walls of said chamber with sufficient force to finely divide and intimately mix the same, continuously directing streams of said air containing said finely divided liquid from each of said centrifugal whirls into violent engagement with each other around the periphery of said whirls while under the influence of said centrifugal force to mix said streams, continuously positively rotatively impelling said mixed streams to further divide and create a uniform intimate blend of said liquid with said air and continuously discharging said blend under the influence of said centrifugal force from said chamber at the periphery of said whirls.

10. The method of producing a uniform blend of a powder and air, comprising creating separate centrifugal whirls in the same direction of a mixture of particles of said powder and air in a chamber, continuously feeding said mixture to said whirls, rotatively whipping said mixture immediately upon entering said whirls to impart centrifugal force thereto and throw the same against the walls of said chamber with sufficient force to finely divide and intimately mix the same, continuously directing streams of said air containing said finely divided powder from each of said centrifugal whirls into violent engagement with each other around the periphery of said whirls while under the influence of said centrifugal force to further divide and create a uniform intimate blend of said powder with said air and continuously discharging said blend under the influence of said centrifugal force from said chamber at the periphery of said whirls.

11. The method of producing a uniform blend of a powder, a liquid and air, comprising creating separate centrifugal whirls in the same direction of a mixture of particles of said powder and liquid and air in a chamber, continuously feeding said mixture to said whirls, rotatively whipping said mixture immediately upon entering said whirls to impart centrifugal force thereto and throw the same against the walls of said chamber with sufficient force to finely divide and intimately mix the same, continuously directing streams of said air containing said finely divided powder and liquid from each of said centrifugal whirls into violent engagement with each other at the periphery of said whirls while under the influence of said centrifugal force to further divide and create a uniform intimate blend of said powder with said liquid and of both said powder and liquid with said air and continuously discharging said blend under the influence of said centrifugal force from said chamber at the periphery of said whirls.

12. The method of producing a uniform blend of a liquid and air, comprising creating separate centrifugal whirls in the same direction of a mixture of particles of said liquid and air in a chamber freely open to the atmosphere, continuously feeding said mixture to said whirls eccentrically thereof, rotatively whipping said mixture immediately upon entering said whirls to impart centrifugal force thereto and throw the same against the walls of said chamber with sufficient force to finely divide and intimately mix the same, continuously directing streams of said air containing said finely divided liquid from each of said centrifugal whirls into violent engagement with each other at the periphery of said whirls while under the influence of said centrifugal force to mix said streams, continuously positively rotatively impelling said mixed streams to further divide and create a uniform intimate blend of said liquid with said air and continuously discharging said blend under the influence of said centrifugal force from said chamber at the periphery of said whirls unrestrictedly at substantially atmospheric pressure.

13. The method of producing a uniform mixture of a liquid in the liquid state and a gas, comprising introducing said liquid and gas into a chamber freely open to the atmosphere and separating the same into portions, rotatively whipping each of said portions about in said chamber separately to create a centrifugal whirl of said gas and liquid of each of said portions, and directing streams of said gas containing said liquid from each of said centrifugal whirls into violent engagement with each other at the periphery of said whirls while under the influence of the centrifugal force created by said whipping to mix said streams, continuously positively rotatively impelling said mixed streams to finely divide and intimately blend said liquid and gas, and unrestrictedly discharging said blend from said chamber at substantially atmospheric pressure under the influence of the centrifugal force of said whirls.

14. The method of producing a uniform blend of a plurality of liquids and air, comprising creating separate centrifugal whirls in the same direction of a mixture of said liquids n the liquid state and air in a chamber, continuously feeding said mixture to said whirls, rotatively whipping said mixture immediately upon entering said whirls to impart centrifugal force thereto and throw the same against the walls of said chamber with sufficient force to finely divide and intimately mix the same, continuously directing streams of said air containing said liquids from each of said centrifugal whirls into violent engagement with each other at the periphery of said whirls while under the influence of said centrifugal force to mix said streams, continuously positively rotatively impelling said mixed streams to further divide and create a uniform intimate blend of said liquids with said air and with each other and continuously discharging said blend under the influence of said centrifugal force from said chamber at the periphery of said whirls.

HERMANN H. SCHMIDT.